United States Patent [19]

Specht

[11] 4,156,174

[45] May 22, 1979

[54] PHASE-ANGLE REGULATOR

[75] Inventor: Theodore R. Specht, Sharon, Pa.

[73] Assignee: Westinghouse Electric Corp., Pittsburgh, Pa.

[21] Appl. No.: 866,153

[22] Filed: Dec. 30, 1977

[51] Int. Cl.² .............................................. G05F 3/04
[52] U.S. Cl. .................................. 323/43.5 R; 323/45
[58] Field of Search .................... 323/43.5 R, 45, 114, 323/120

[56]  References Cited

U.S. PATENT DOCUMENTS 2,000,776  5/1935  Mercereau et al. ............ 323/43.5 R

FOREIGN PATENT DOCUMENTS 290270  4/1971  U.S.S.R. .................................... 323/45

*Primary Examiner*—A. D. Pellinen
*Attorney, Agent, or Firm*—D. R. Lackey

[57]  ABSTRACT

Phase angle regulator for high voltage power distribution systems. An electrical transformer having inductively coupled series and regulating windings is provided with the series windings connected between a source of electrical power and an electrical load circuit and the regulating winding connected to an excitation transformer which, when excited, causes a voltage to be induced in the series windings which is in quadrature with the line conductor voltages. Auxiliary windings, one of which is arranged in a partial interconnected star configuration with each regulating winding, are connected to a regulating winding in a different phase of the series transformer to cause the voltage induced in the respective series winding to be phase shifted to a predetermined electrical angle with respect to the line voltage which minimizes the variation between the load and source voltages over the range of phase shifts provided by the phase angle regulator.

7 Claims, 9 Drawing Figures

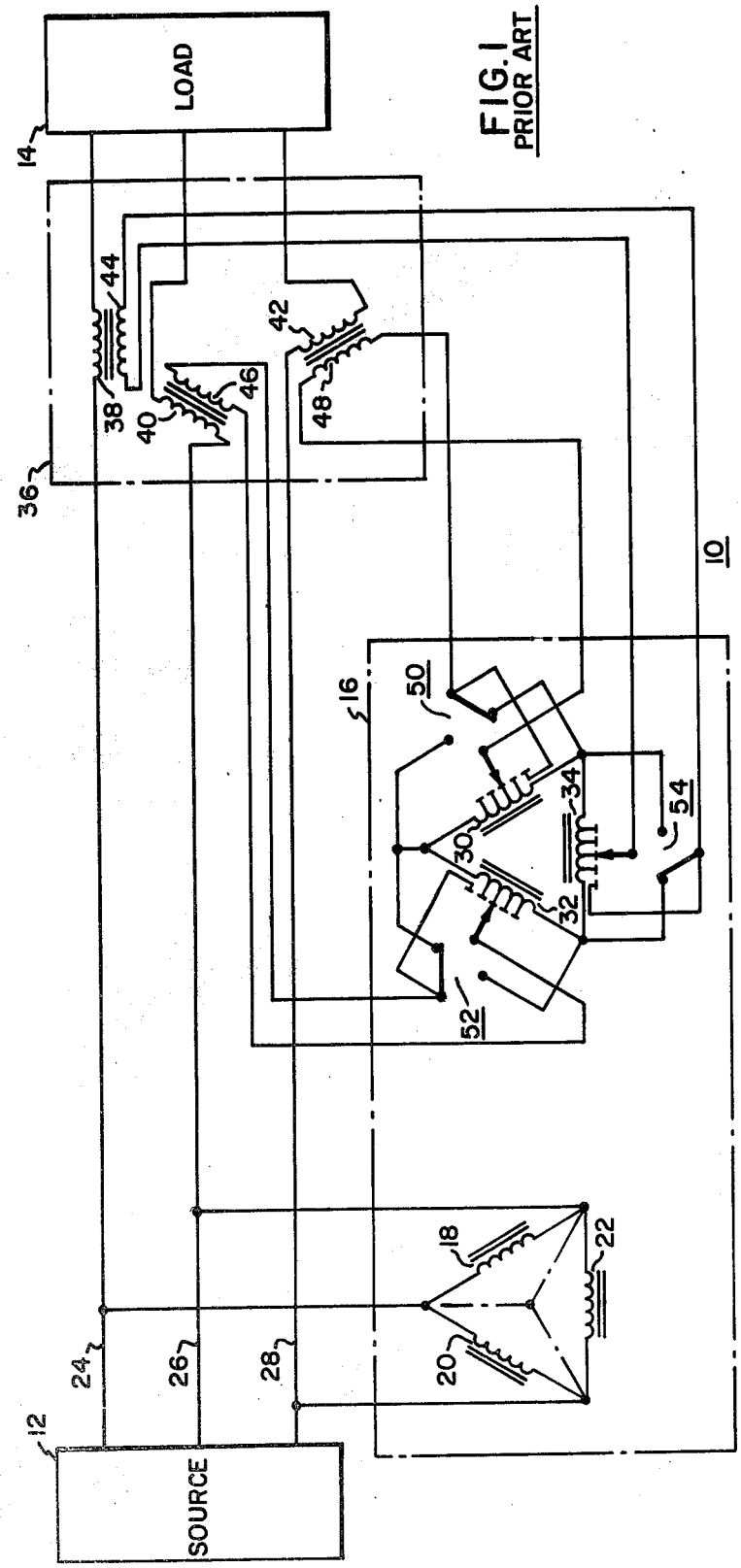
FIG. 1
PRIOR ART
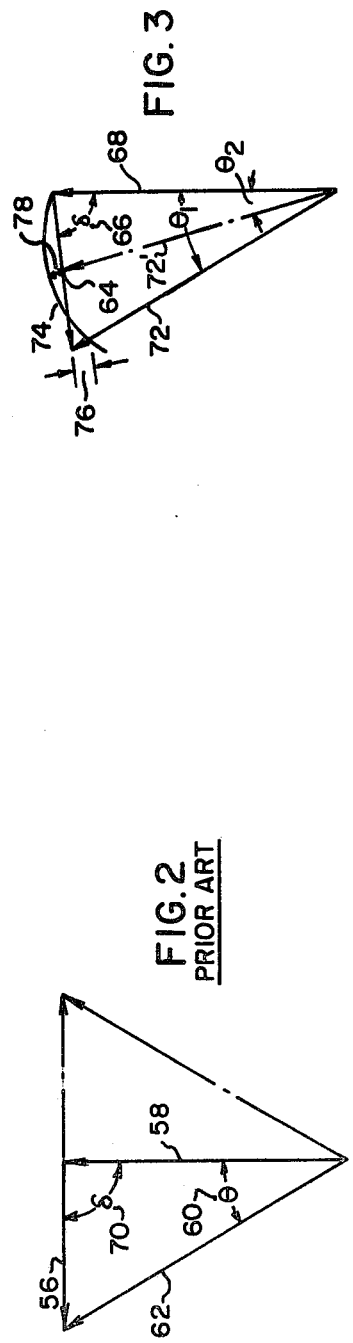
FIG. 3
FIG. 2
PRIOR ART

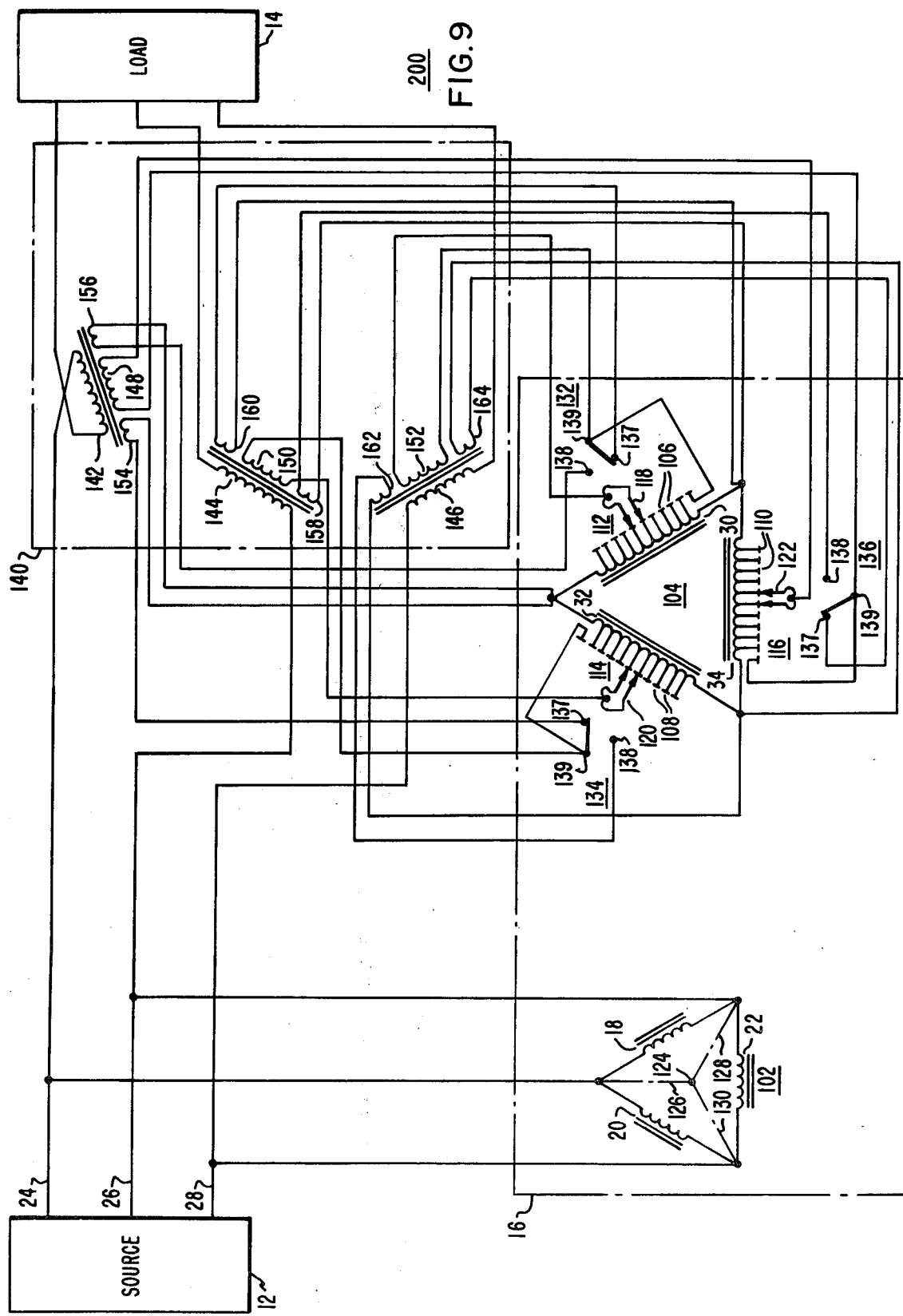

PHASE-ANGLE REGULATOR

BACKGROUND OF THE INVENTION

1. Field of the Invention

This invention relates, in general, to electrical regulator apparatus and, more specifically, to phase-angle regulators.

2. Description of the Prior Art

Phase-angle regulators are utilized in electrical power distribution systems to correct the phase angle difference between two parallel connected electrical transmission systems and thereby control the power flow between the two systems so that each can be loaded to its maximum capacity. Conventional phase-angle regulators insert a series voltage between the two transmission systems that is in quadrature with the line-to-neutral voltage of one of the systems. The series voltage produces a phase shift whose magnitude varies with the magnitude of the series voltage typically induced through tap changing means on the regulator.

A conventional type of phase-angle regulator, as shown in U.S. Pat. No. 3,690,739 which is assigned to the assignee of the present invention, uses a series transformer having a single series winding per phase. In this type of phase regulating circuit, the load voltage increases in magnitude as the phase angle introduced by the phase-angle regulator increases in magnitude. This has adverse effects since it is desirable to closely match the magnitudes of the load and source voltages when tying the two electrical transmission systems together.

Another common type of phase-angle regulator utilizes a series transformer having a center-tapped series winding. In this type of configuration, the load and source voltages are equal, however, it is difficult to design the center-tapped series winding with sufficient electrical insulation from the ends of the winding to the center tap. It is possible to bring the tap out of the transformer tank through a bushing and limit the voltage across each half winding section by lightning arresters; however, this is expensive and creates additional problems in higher voltage units.

Thus, it would be desirable to provide a phase-angle regulator having a single series winding per phase in which the variation between the magnitudes of the load and source voltages is minimized over the range of phase angles provided by the phase-angle regulator.

It would also be desirable to provide such a phase-angle regulator in which a standard tap changer may be utilized to provide the proper orientation or phase angle of the series voltage with respect to the line voltage despite reversal of the phases of the regulator.

SUMMARY OF THE INVENTION

Herein disclosed is a novel phase-angle regulator for use in electrical power distribution systems. The phase-angle regulator includes a three-phase electrical transformer having inductively coupled series and regulating windings in which the series windings are serially connected with the line conductors between a source of electrical potential and a load circuit. The regulating phase windings are connected, through appropriate tap contacts, to an excitation transformer which, when excited, causes a voltage to be induced in the series windings which is in quadrature with the respective line voltages. Means for phase shifting the voltage induced in each series winding is provided and includes an auxiliary winding arranged in a partial interconnected star configuration with each regulating phase winding. Each of the regulating windings has one end thereof connected to one end of the particular secondary winding of the excitation transformer that is disposed in 90° phase relation with respect to the line voltage across the respective series winding associated with the regulating winding. The other end of each regulating winding is connected to an auxiliary winding associated with a different phase of the series transformer than each regulating winding by the phase reversal switch of the tap changer associated with the excitation transformer secondary winding described above. The other end of each auxiliary winding is connected to the second end of the excitation transformer secondary winding disposed in 90° phase relation to the line voltage of each respective series winding to complete an electrical circuit that, upon energization of the excitation transformer, causes a voltage to be induced in each series winding that is at a predetermined electrical angle with respect to the voltage in the respective line conductors. This novel configuration minimizes the variation of the magnitude of the load voltage with respect to the source voltage over the range of phase shifts provided by the regulator compared to prior art phase-angle regulators using single winding series transformers. By selecting the proper ratio of turns of each auxiliary winding to the regulating winding, in view of the maximum phase shift to be provided by the regulator, the series voltage can be phase shifted a predetermined amount such that the load voltage is a predetermined amount smaller than the source voltage at an intermediate phase shift and, further, is the same predetermined amount larger than the source voltage at the maximum phase shift provided by the regulator which, thereby, reduces the variation between the magnitudes of the load and source voltages over the entire range of phase shifts provided by the regulator.

When the phase reversing switch on each tap changer is moved to a second position to reverse the phase orientation of the series voltages, an auxiliary winding associated with a different phase of the series transformer than the previously mentioned auxiliary and regulating windings is connected to each regulating winding to insure the proper orientation of the phase angle between the series and line voltages and to maintain the series voltage at the aforementioned predetermined phase angle with respect to the line voltage.

The interconnection of the auxiliary and regulating winding in the aforementioned manner substantially reduces the variation of the magnitude of the load voltage with respect to the source voltage over the range of phase shifts provided by the regulator compared to a prior art type of phase-angle regulator having a single winding series transformer. Furthermore, by utilizing the phase reversing switch on the tap changers to select an auxiliary winding from a different phase of the series transformer and thereby maintain the series voltage at the proper phase angle with respect to the line voltage, a standard tap changer may be used which simplifies construction of the phase-angle regulator and reduces costs.

BRIEF DESCRIPTION OF THE DRAWINGS

The various features, advantages and other uses of this invention will become more apparent by referring to the following detailed description and the accompanying drawing in which:

FIG. 1 is a schematic diagram of a prior art type of phase-angle regulator;

FIG. 2 is a vector diagram showing the relationship between the voltages of the regulator shown in FIG. 1;

FIG. 3 is a vector diagram of a desirable voltage relationship for a phase-angle regulator;

FIG. 9 is a schematic diagram of another embodiment of a phase-angle regulator constructed according to the teachings of this invention.

DESCRIPTION OF THE PREFERRED EMBODIMENTS

Figure 4:
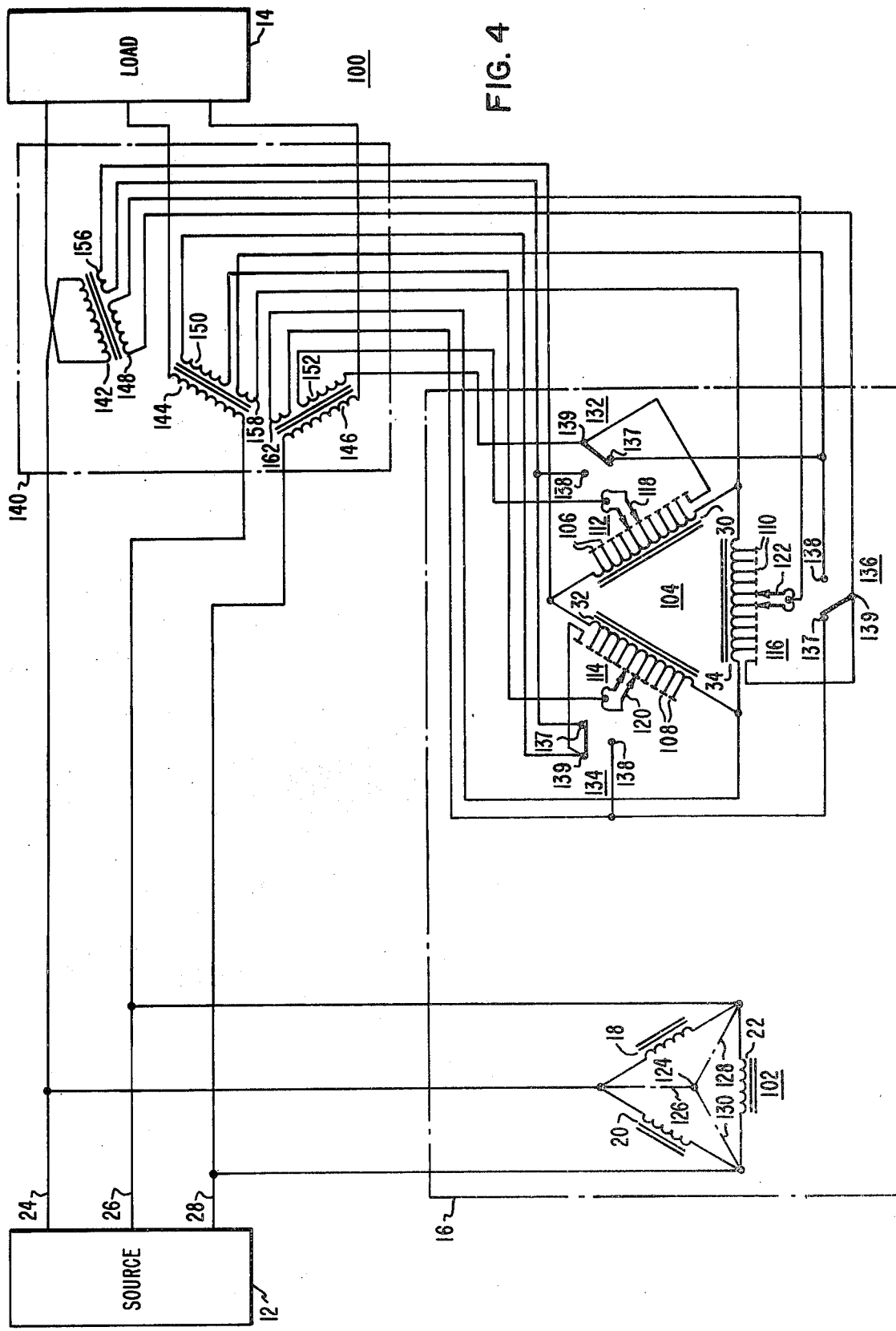
FIG. 4 is a schematic diagram of a phase-angle regulator constructed according to the teachings of this invention and shown in the advance position.

Throughout the following description, identical reference numbers refer to the same component shown in all figures of the drawing.

Referring now to the drawing, and to FIG. 1 in particular, there is shown a prior art phase-angle regulator 10 for changing the phase relationship between a source 12 of three-phase alternating electrical power and a load 14. The phase-angle regulator 10 includes a three-phase excitation transformer 16 which has primary windings 18, 20 and 22 connected in a delta-type arrangement to respective line conductors 24, 26 and 28. The excitation transformer 16 also includes secondary windings 30, 32 and 34 which are inductively coupled to the primary windings 18, 20 and 22, respectively, and are further connected to the windings of a three phase series transformer 36 as described hereafter.

The series transformer 36 includes single series windings 38, 40 and 42 which are serially connected to the line conductors 24, 26 and 28, respectively, between the source and load circuits 12 and 14. The series transformer 36 further includes regulating windings 44, 46 and 48 which are inductively coupled to the respective series windings 38, 40 and 42 and are each connected by suitable tap changing means 50, 52 and 54 to a secondary winding of the excitation transformer 16 that is disposed in 90° phase to the line-to-neutral voltage across the respective series windings 38, 40 and 42. Thus, regulating winding 44 is connected via tap changer 54 to the excitation transformer secondary winding 34, series transformer regulating winding 46 is connected via tap changer 52 to excitation transformer secondary winding 32 and regulating winding 48 is connected via tap changer 50 to the excitation transformer secondary winding 30.

Upon energization of the excitation transformer 16, a voltage will be induced in each series winding 38, 40 and 42 of the series transformer 36 which is in quadrature, at a phase angle of 90°, with respect to the line-to-neutral voltage on each line conductor 24, 26 and 28 connected to the respective series windings 38, 40 and 42. The magnitude of the induced series voltage is determined by the turns ratio of the series transformer 36 and the tap position of the tap changers 50, 52 and 54 associated with the secondary windings of the excitation transformer 16. As shown more clearly in FIG. 2 for series winding 38, the induced series voltage, illustrated by vector 56, is disposed at 90° phase relation with respect to the line-to-neutral voltage on conductor 24, illustrated by vector 58. The induced series voltage adds vectorily to the line-to-neutral voltage and results in a phase shift $\theta$, reference number 60, between the line-to-neutral voltage vector 58 and the resultant load voltage vector 62. As is clearly evident from FIG. 2, the load voltage increases in magnitude with an increase in phase angle or shift between the load and source voltages. Thus, for a 15° phase shift between the load and source voltages, $\theta = 15°$, the magnitude of the load voltage will be 1.035 times the source voltage or an increase of 3.5%. It is desirable when tying two electrical transmission systems together, such as the source of electrical power 12 and the load circuit 14, to minimize the variation between the magnitudes of the load and source voltages over the range of phase shifts provided by the phase-angle regulator in order to control the power flow between the two systems and thereby load each system to its maximum capability.

In order to minimize the variation between the magnitudes of the load and source voltages over the range of phase shifts provided by the phase-angle regulator, this application novelly proposes to phase shift the voltage of each series winding in the series transformer an additional amount to a predetermined phase electrical angle with respect to the line-to-neutral voltage. It has been found that an optimum phase angle exists between the induced series voltage and the line-to-neutral voltage at which the variation of the load voltage with respect to the source voltage over the range of phase shifts provided by the regulator is minimized. This optimum phase angle depends upon the maximum phase shift provided by the phase-angle regulator. Since phase-angle regulators providing a maximum of 15° phase shift between the load and source voltages are common for apparatus of this type, the following discussion will relate to a phase-angle regulator having a maximum of 15° phase shift. It will be understood that the teachings of this invention are equally applicable to phase-angle regulators having different amounts of phase shift in which case a different optimum phase angle would be used.

FIG. 3 depicts vectorially how phase shifting of the series voltage with respect to the line-to-neutral voltage minimizes the variation between the load and source voltages over the range of phase shifts provided by a phase-angle regulator constructed according to the teachings of this invention. In FIG. 3, the series voltage vector 64 is shown inclined at a phase angle $\delta$, reference number 66, with respect to the line-to-neutral voltage vector 68, with the phase angle $\delta$ 66 being slightly smaller, by a predetermined amount, than the 90° phase angle 70 between the series voltage 56 and the line voltage 58 shown in FIG. 2. With the series voltage inclined at the optimum phase angle $\delta$ with respect to the line voltage 68, the load voltage vector 72 will be slightly larger in magnitude than the magnitude of the line or source voltage vector 68 at the maximum phase shift of 15° provided by the phase-angle regulator. This difference is shown symbolically by reference number 76 which is the difference between the end of the load voltage vector 72 and the radius or arc 74 indicative of the magnitude of the source voltage vector 68 at the maximum phase shift $\theta_1$ provided by the phase-angle regulator. Correspondingly, at an intermediate phase shift $\theta_2$, which can be calculated to be 6.222°, the magnitude of the load voltage vector, indicated by reference number 72′, will be a predetermined amount 78, which is the same as the difference indicated by reference number 76 for phase shift $\theta_1$, less than the magnitude of the source voltage 68. For a phase-angle regulator having a maximum phase shift of 15°, the optimum phase angle $\delta$, reference number 66, which minimizes the variation between the load and source voltages is calculated to be 83.778°. Thus, when the series voltage 64 is phase shifted to a phase angle $\delta$ equal to 83.778°, by means described hereafter, and has a magnitude resulting in the maximum 15° phase shift between the load and source voltages, the load voltage vector 72 will be 1.00589 times as large as the magnitude of the source voltage vector 68, thereby resulting in an increase, as indicated by the reference number 76, of 0.589%. Similarly, at an intermediate phase shift, $\theta_2=6.222°$, the load voltage will be 0.9941 times as large as the source voltage or again a difference of 0.589%. Thus, the variation between the magnitudes of the load and source voltages for a maximum 15° phase shift has been reduced from 3.5% for the conventional prior art type of phase-angle regulator shown in FIGS. 1 and 2 to 0.589%, which is more satisfactory.

Referring now to FIG. 4, there is shown a phase-angle regulator 100 constructed according to the teachings of this invention which provides phase shifting of the series voltage with respect to the line voltage in order to minimize the variation of the load voltage with respect to the source voltage over the range of phase shifts provided by the regulator 100. The phase-angle regulator 100 provides the means for changing the phase relationship between the source 12 and the load 14. The source 12 may be any type of three-phase alternating current power source or delivery system and the load 14 may be any type of power consuming or transferring system. The source and load 12 and 14, respectively, are joined together by line conductors 24, 26 and 28 which form an electrical circuit in which the source and load 12 and 14, respectively, act as input and output terminals thereof.

The phase-angle regulator 100 includes an excitation transformer 16 having first and second winding sets 102 and 104, respectively; each containing three winding sections. The winding sections may be the windings of a transformer having a common magnetic structure or may be separate transformers which are properly interconnected to give the required three-phase relationships. For the purposes of this discussion, the first winding set 102 will be considered as the primary windings of the excitation transformer 16 and the second winding set 104 will be considered as the tapped secondary windings of the excitation transformer 16.

The primary winding set 102 includes first, second and third primary windings 18, 20 and 22, respectively, which are arranged in a delta-type configuration and connected to line conductors 24, 26 and 28. Although a delta-type configuration is illustrated, this invention is equally applicable to a wye-type connection arrangement. The secondary winding set 104 of the excitation transformer 16 includes first, second and third secondary phase windings 30, 32 and 34, respectively which are also connected in delta. Each secondary winding of the excitation transformer 16 consists of a plurality of winding sections which are brought out to stationary contacts or taps, such as taps 106, 108 and 110 on the secondary windings 30, 32 and 34, respectively.

Associated with each of the first, second and third secondary windings 30, 32 and 34 are suitable tap changer means 112, 114 and 116, respectively. The first, second and third tap changers 112, 114 and 116 each include movable contact assemblies 118, 120 and 122, respectively, which selectively engage the respective taps on each secondary winding of the excitation transformer 16. Although the movable contact assemblies are illustrated as consisting of a preventive autotransformer to limit tap-to-tap currents during a tap change, other conventional arrangements may also be used to practice this invention. In addition, the movable contacts 118, 120 and 122 may be mechanically interconnected so that the secondary winding set 104 of the excitation transformer 16 may be balanced throughout the tap range.

In addition to the movable contact assembly, each tap changer further includes a phase reversing switch, such as phase reversing switches 132, 134 and 136 for tap changers 112, 114 and 116, respectively. Each phase reversing switch includes a movable contact which is switchable between a first position 137 and a second position 138 to enable the electrical utility to reverse the phase orientation and increase the tap range of the excitation transformer 16.

Instead of showing the phase windings of the excitation transformer 16, and the phase windings of the series transformer 140 to be described hereafter, in their normal physical relation, they are shown in what may be described as their voltage vector relation for ease in understanding this invention. Thus, the axes of all the phase windings are parallel to their respective voltage vectors. For example, the phase windings 20 and 32 belong to the same phase of the excitation transformer 16 as their voltage vectors are in phase and shown parallel with each other. Similarly, phase windings 18 and 30 of the excitation transformer 16 belong to the same phase and are 120 electrical degrees displaced from the voltages of the windings 20 and 32. Structurally, the windings belonging to each phase will be wound on the same core leg of a three-legged magnetic core of a three-phase electrical transformer or on separate cores of single-phase transformers which are interconnected for polyphase operation. The line-to-neutral voltages of the line conductors 24, 26 and 28 to the neutral point 124 of the excitation transformer 16 are indicated by voltage vectors 126, 128 and 130, respectively.

The phase-angle regulator 100 also includes a series transformer 140. The series transformer 140 contains first, second and third series or secondary windings 142, 144 and 146, respectively, which are serially connected to the respective line conductors 24, 26 and 28 between the source 12 and the load 14. First, second and third primary or regulating windings 148, 150 and 152 are disposed in inductive relation with respective series windings 142, 144 and 146. As with the windings of the excitation transformer 16, the windings of the series transformer 140 may be the windings of a transformer having a common magnetic structure or may be separate transformers which are properly interconnected to give the required phase relationships. Each phase or regulating winding of the series transformer 140 further includes an auxiliary winding which is arranged in an interconnected star or partial zig-zag configuration with the respective regulating winding. Structurally, the auxiliary winding and the associated regulating winding of the series transformer 140 share a common leg of the magnetic core of the series transformer 140. It is desirable to place each auxiliary winding physically between its associated series and regulating windings on the leg of the magnetic core of the series transformer 140. Since each auxiliary winding is connected to the secondary 104 of the excitation transformer 16, it is at ground potential and, thus, acts as a shield to prevent the regulating windings from being capacitively coupled to the series windings during the operation of the phase reversal switches. As seen in FIG. 4, a first auxiliary winding 156 is associated with the first regulating winding 148, auxiliary winding 158 is associated with the second regulating winding 150 and auxiliary winding 162 is associated with the third regulating winding 152 of the series transformer 140.

The amount of phase shift of the series voltage is determined by the ratio of the turns of the auxiliary windings to the regulating windings. In order to phase shift the series voltage 83.778° with respect to the line voltage, as described previously, the voltage across each auxiliary winding should be 0.13435 of that across the corresponding regulating winding to which it is connected. Thus, a turn ratio of 2:15, or multiples thereof, between the auxiliary and regulating windings will produce the desired amount of phase shift of the series voltage.

The interconnection of the secondary windings 30, 32 and 34 and the associated tap changers 112, 114 and 116 of the excitation transformer 16 with the auxiliary and regulating windings of the series transformer 140 to provide the aforementioned phase shift of the series voltage will now be described. Basically, one end of the regulating winding in each phase of the series transformer 140 will be connected to an auxiliary winding from a different phase of the series transformer in order to produce the proper phase orientation of the voltage in the regulating winding. The other ends of the connected auxiliary and regulating windings will be connected across a secondary winding of the exciting transformer 16 that is disposed in 90° phase relation with respect to the line-to-neutral voltage on the conductor to which the series winding, inductively coupled to the selected regulating winding, is connected. The means for interconnecting the aforementioned windings is achieved by use of the phase reversing switch and the movable contact assembly of the tap changer associated with the particular secondary winding of the exciting transformer 16.

Figure 5:
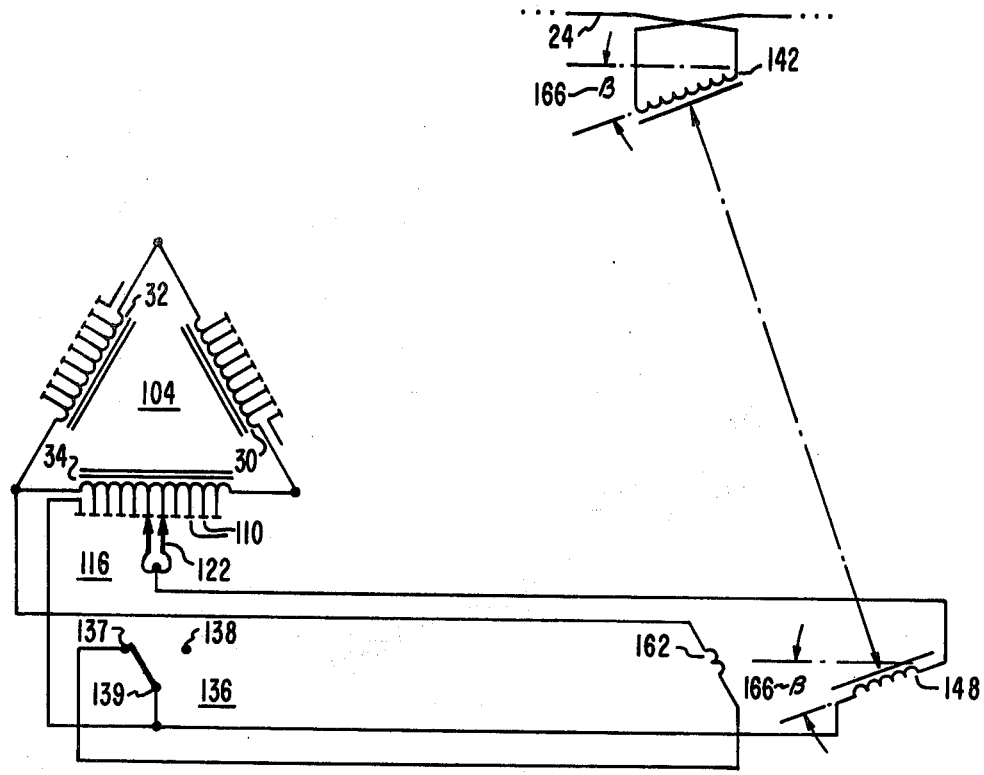
FIG. 5 is a schematic diagram showing one phase of the regulator shown in FIG. 4.

Referring now to FIG. 5, there is shown, for clarity, the connections associated with one phase of the series transformer 140. As shown therein, the first series winding 142 and the first regulating winding 148, inductively coupled thereto, are illustrated in their voltage vector relation. The regulating winding 148 is shown in association with the secondary winding 34 of the excitation transformer 16 which is disposed in 90° phase relation from the line-to-neutral voltage on conductor 24 to which the series winding 142 is connected. Tap changer 116 is associated with the secondary winding 34 and has its movable contacts 122 selectively engaging certain of the taps or stationary contacts 110 on the secondary winding 34 in order to induce a voltage in the series winding 142 which has a particular magnitude so as to provide the desired phase shift between the load and source voltages. The phase reversing switch 136 of the tap changer 116 includes a suitable movable contact having one end secured to terminal 139 and another end switchable between electrical engagement with terminals 137 and 138. The phase reversing switch 136 is connected to terminal 137 which, according to the preferred embodiment of this invention, is position 1 or the advance position in which the load voltage has a leading phase angle with respect to the source voltage. The movable contact assembly 122 of the tap changer 116 is connected to one end of the regulating winding 148. The other end of the regulating winding 148 is connected to the stationary or fixed terminal 139 of the phase reversing switch 136. Terminal 137 of the phase reversing switch 136 is connected to one end of auxiliary winding 162 which is associated with a phase of the series transformer 140 different from the phase of the regulating winding 148. With the phase reversing switch 138 in the advance or first position, one end of the regulating winding 148 is serially connected to one end of the auxiliary winding 162. The other end of the auxiliary winding 162 is connected to the first end of the secondary winding 34 of the excitation transformer 16, thus completing the electrical circuit.

Figure 6:
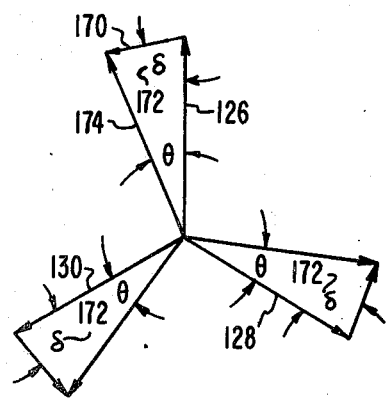
FIG. 6 is a vector diagram showing the voltage relationships of the phase-angle regulator shown in FIG. 4.

It can be seen in FIG. 5 that the voltage vector of the secondary winding 34 of the excitation transformer is the resultant of the connected voltage vectors of the regulating winding 148 and the auxiliary winding 162. When the turns ratio of the regulating winding 148 to the auxiliary winding 162 is 15:2, the voltage vector of the regulating winding 148 will be offset or phase shifted from the horizontal, as viewed in FIG. 5, by an angle $\beta$, indicated by reference number 166. Upon energization of the excitation transformer 16, current will flow in the circuit formed between the regulating winding 148, the auxiliary winding 162 and the secondary winding 34. This current will cause a voltage to be induced in the series winding 142 inductively coupled to the regulating winding 148 which is likewise offset or phase shifted from the horizontal by a phase angle $\beta$ 166. For a phase-angle regulator 110 having a maximum phase shift of 15° and a turns ratio between the regulating winding 148 and the auxiliary winding 162 of 15:2, the phase angle $\beta$ will be 6.222°. As the line-to-neutral voltage vector 126, FIG. 1, of line conductor 24 is vertically oriented, the phase shifting of the voltage vector of the series winding 142 of 6.222° results in a phase shift of 83.778° from the vertical or line-to-neutral voltage vector. This voltage vector relationship is more clearly shown in FIG. 6 wherein vector 126 is indicative of the line-to-neutral voltage on conductor 124 with respect to the neutral point 124 of the electrical system and vector 170 is indicative of the series voltage induced in the series winding 142 of the series transformer 140. Vector 170 is shown offset or phase-shifted with respect to the vector 126 by phase angle $\delta$, reference number 172, which according to the above-described example, is 83.778° for a maximum 15° phase shift. The vectors 126 and 170 may be added algebraically with the resultant vector 174 indicating the magnitude and phase angle of the load voltage at the phase shift determined by the tap setting on the tap changer 116.

It is clear that with the phase reversing switches of the tap changers 112, 114 and 116 set in the first or advance position, similar series voltages are induced in each of the series windings 142, 144 and 146, although offset 120° with respect to each other, by circuits similar to that shown in FIG. 5. Thus, a series voltage is induced in the second series winding 144 of the series transformer 140 which has the desired phase shift with respect to its associated line-to-neutral voltage by a circuit formed between regulating winding 150, auxiliary winding 156 and secondary winding 32 of the excitation transformer 16, FIG. 4. A similar circuit exists for the third series winding 146 of the series transformer 140 and consists of regulating winding 152, auxiliary winding 158 and secondary winding 30 of the excitation transformer 16. The series voltages induced in each of the series windings 142, 144 and 146 of the series transformer 140 are offset or phase shifted the same predetermined angle δ, reference number 172, with respect to their respective line-to-neutral voltages 126, 128 and 130, as shown vectorially in FIG. 6.

At appropriate times the electrical utility may desire to reverse the phase orientation of the source and load voltages. Such a phase reversal is accomplished by switching the phase reversing switches, such as phase reversing switch 136 on tap changer 116, from the first position to the second or retard position in which the source voltage has a leading phase angle with respect to the load voltage. In order to insure that the series voltage is at the proper phase angle with respect to the line-to-neutral voltage upon phase reversal, an auxiliary winding from a phase of the series transformer 140 different from the phase associated with the auxiliary winding connected to a particular regulating winding when phase reversing switches are in the first position is connected via the second position of the phase reversing switch to the appropriate regulating winding of the series transformer 140. Although the phase-reversing switch on a standard tap changer is utilized to select the proper auxiliary winding, other switch means, including a separate switch for selecting the proper auxiliary winding, are also within the scope of this invention.

Figure 7:
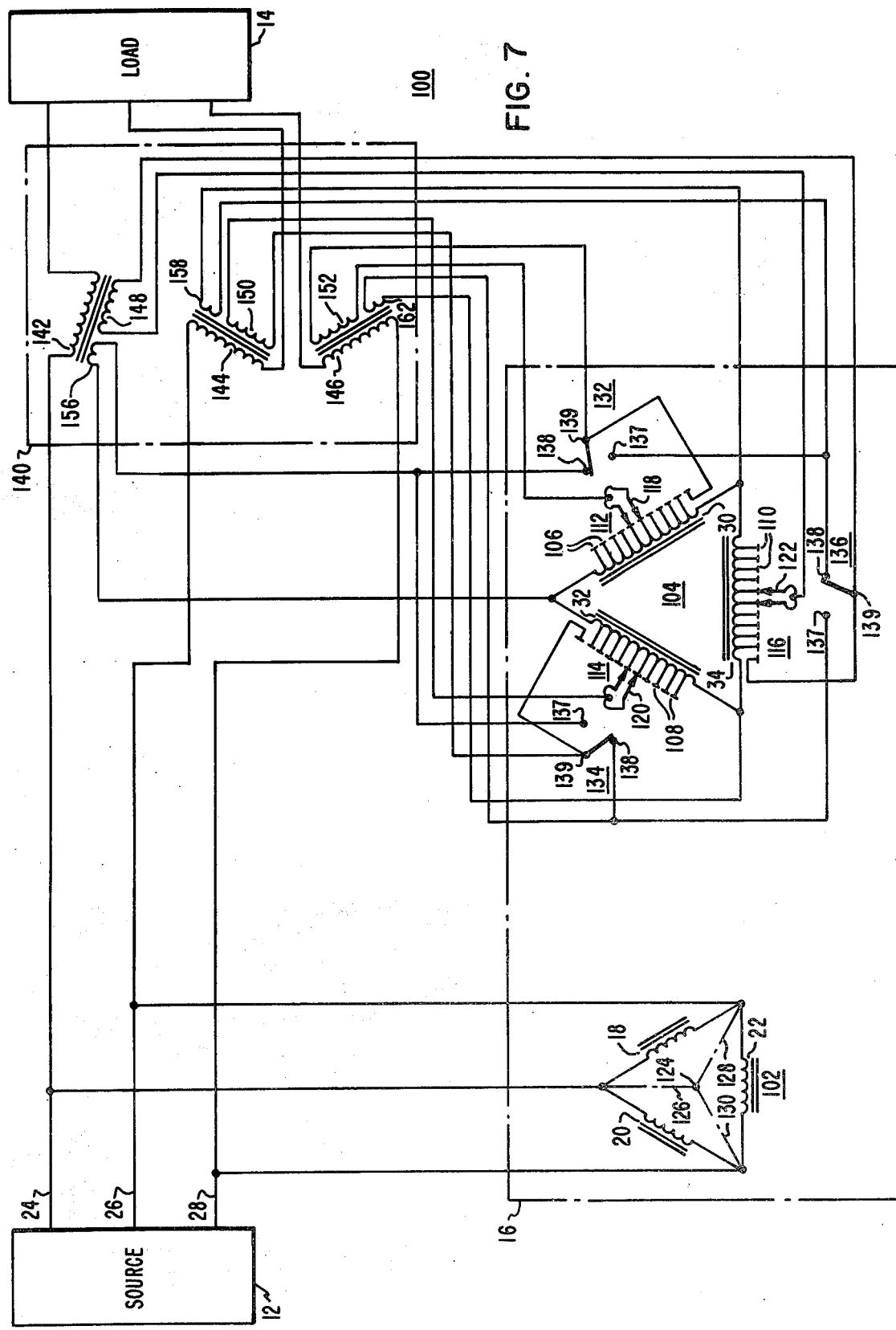
FIG. 7 is a schematic diagram of a phase-angle regulator similar to that shown in FIG. 4 but illustrated in the retard position.

The phase-angle regulator 100 is shown in FIG. 7 in the retard position wherein each phase reversing switch 132, 134 and 136 is in the second position to form an electrical connection between terminals 138 and 139. When the phase reversing switches are in the second position, a voltage will be induced in series winding 142 by the circuit formed by regulating winding 148, auxiliary winding 158 and the secondary winding 34 of the excitation transformer 16. Similarly, a series voltage will be induced in series winding 144 by the circuit formed by regulating winding 150, auxiliary winding 162 and secondary winding 32 of the excitation transformer 16; while the voltage induced in series winding 146 is caused by the circuit formed by regulating winding 152, auxiliary winding 156 and secondary winding 30 of the excitation transformer 16. This configuration results in a series voltage that is phase shifted to a predetermined angle δ with respect to the respective line-to-neutral voltage.

Figure 8:
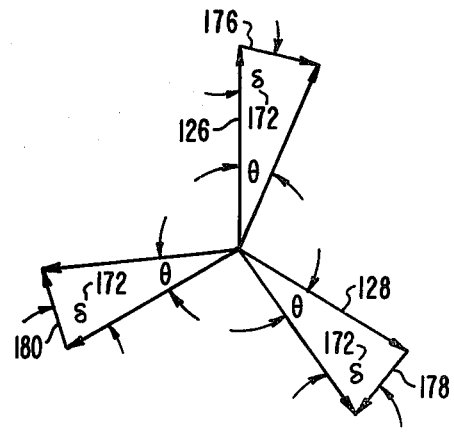
FIG. 8 is a vector diagram showing the voltage relationships of the phase-angle regulator shown in FIG. 7.

FIG. 8 illustrates the voltage vector relationships for the phase-angle regulator 100 shown in FIG. 7. As seen therein, the vectors 176, 178 and 180, which are indicative of the induced series voltages in series windings 142, 144 and 146, respectively, are disposed at a phase angle δ, reference number 172, with respect to the line-to-neutral voltages of their associated line conductors, as illustrated by vectors 126, 128 and 130, respectively. It will also be noted that by connecting an auxiliary winding from a different phase of the series transformer upon phase reversal, the induced series voltage is maintained at the proper phase angle with respect to the line-to-neutral voltage which provides the desired minimum variation between the magnitudes of the load and source voltages over the range of phase shifts provided by the phase-angle regulator 100.

Referring now to FIG. 9, there is shown another embodiment of a phase angle regulator constructed according to the teachings of this invention. Phase-angle regulator 200, shown in the advance position, includes the same elements or components as regulator 100, shown in FIGS. 4 and 7, with the addition of a second auxiliary winding in each phase of the series transformer 140. Thus, first and second auxiliary windings 154 and 156, each having the same number of turns, are disposed in a partial interconnected star configuration with regulating winding 148; auxiliary windings 158 and 160 are associated with regulating winding 150 and auxiliary windings 162 and 164 are associated with regulating winding 152.

With the phase reversing switches 132, 134 and 136 disposed in the first position, wherein each movable contact is connected between terminals 137 and 139, each regulating winding 148, 150 and 152 is connected to the proper auxiliary winding to produce the desired phase shift of the series voltages. Accordingly, phase reversing switch 136 connects regulating winding 148 and auxiliary winding 164 across secondary winding 34 of the excitation transformer 16. Similarly, regulating winding 150 and auxiliary winding 154 are connected to secondary winding 32 by phase reversing switch 134; while regulating winding 152 and auxiliary winding 160 are connected to secondary winding 30 of excitation transformer 16 by phase reversing switch 132. In this configuration, the voltages induced in series windings 142, 144 and 146 are phase shifted to the same phase angle with respect to their respective line-to-neutral voltage as described previously with respect to FIG. 4. Upon phase reversal, each regulating winding 148, 150 and 152 is connected to auxiliary windings 158, 162 and 156, respectively, in order to maintain the proper orientation of the phase-shifted series voltage.

Thus, it will be apparent to one skilled in the art that there has been herein disclosed a novel phase-angle regulator having a single winding series transformer which minimizes the variation between magnitudes of the load and source voltages over the range of phase shifts provided by the regulator. By arranging auxiliary windings in an interconnected star configuration with each regulating winding of the series transformer and connecting each auxiliary winding to a regulating winding in a different phase of the series transformer, the series voltage is phase shifted with respect to the respective line-to-neutral voltage associated therewith to an optimum phase angle which produces the desired minimum variation between the load and source voltages. In addition, the phase reversing switches of a standard tap changer connect an auxiliary winding associated with a different phase of the series transformer to the regulating winding in order to obtain the proper phase relationship upon phase reversal. This enables a standard tap changer to be utilized which simplifies construction of the phase-angle regulator and reduces costs.

What is claimed is:
1. Phase-angle regulator comprising:
a three-phase excitation transformer having primary and secondary windings, said primary windings disposed for connection to a source of electrical potential; and
a three-phase series transformer having series windings disposed to be connected between said source of electrical potential and an electrical load, and a regulating and an auxiliary winding inductively coupled to each of said series windings;

each of said regulating windings being connected to an auxiliary winding of a different phase of said series transformer than said each of said regulating windings and to a secondary winding of said excitation transformer which, upon energization of said excitation transformer, causes a voltage to be induced in said series winding inductively coupled to said each of said regulating windings that is at a predetermined electrical phase-angle with respect to the voltage existing between said source of electrical potential and said series winding which minimizes the difference between the voltages of said source of electrical potential and said load.

2. The phase-angle regulator of claim 1 wherein the predetermined electrical phase-angle of the voltage induced in each of the series windings is less than 90° out of phase with the voltage between the source of electrical potential and said each of said series windings such that, at the maximum phase shift provided by said phase angle regulator, the voltage at the load is slightly larger than the voltage at the source of electrical potential by a predetermined amount and, at an intermediate phase shift, the voltage at said load is slightly smaller than the voltage at said source of electrical potential by said same predetermined amount.

3. The phase-angle regulator of claim 1 wherein said phase-angle regulator provides a maximum 15° phase shift between the voltages at the source of electrical potential and the load and wherein the predetermined electrical phase angle that the voltage, induced in each of the series windings, is disposed at approximately 83.778° with respect to the voltage existing between said source of electrical potential and said series windings.

4. The phase-angle regulator of claim 1 further including switch means, switchable between first and second positions, for connecting one of the auxiliary windings to one of the regulating windings when in said first position and for connecting another one of said auxiliary windings to said one of said regulating windings when in said second position in order to maintain the voltage induced in the respective series windings at the same predetermined electrical phase angle.

5. The phase-angle regulator of claim 4 wherein each of the secondary windings of the excitation transformer include a plurality of tapped windings and tap changing means, said tap changing means selectively engaging said tapped windings in order to induce the desired magnitude of voltage in each of the series windings of the series transformer.

6. The phase-angle regulator of claim 5 wherein the switch means comprises phase reversing switches, switchable between first and second positions, and associated with each of the tap changing means for reversing the phase of the secondary windings of the excitation transformer.

7. The phase-angle regulator of claim 4 further including:
a second auxiliary winding associated with each of the regulating windings; and wherein
each of the switch means connects when in the first position, a first one of said first and second auxiliary windings to one of the regulating windings of a different phase of the series transformer and connects, when in the second position, another one of said first and second auxiliary windings from a phase of said series transformer different than the phase of said one of said regulating windings connected thereto and the phase of said first one of said first and second auxiliary windings associated with said first position thereof to said one of said regulating windings.

* * * * *